United States Patent
Wang

Patent Number: 5,796,203
Date of Patent: Aug. 18, 1998

[54] NOISE SUPPRESSED COMMUTATOR

[75] Inventor: Patrick Shui-Chung Wang, Repulse Bay, Hong Kong

[73] Assignee: Johnson Electric, S.A., La Chaux de Fonds, Switzerland

[21] Appl. No.: 843,547

[22] Filed: Apr. 18, 1997

Related U.S. Application Data

[63] Continuation of Ser. No. 435,734, May 5, 1995, abandoned.

[30] Foreign Application Priority Data

May 11, 1994 [GB] United Kingdom ............ 9409375

[51] Int. Cl.$^6$ ............ H02K 13/04; H02K 39/04
[52] U.S. Cl. ............ 310/233; 310/51; 310/682; 310/71; 310/220
[58] Field of Search ............ 310/51, 682, 71, 310/220, 233

[56] References Cited

U.S. PATENT DOCUMENTS

| | | | |
|---|---|---|---|
| 4,199,537 | 4/1980 | Zardi et al. | 261/112 |
| 4,199,637 | 4/1980 | Sado | 339/60 R |
| 4,252,391 | 2/1981 | Sado | 339/60 R |
| 4,316,171 | 2/1982 | Miyabayashi et al. | 338/221 |
| 4,859,893 | 8/1989 | Wang | 310/234 |
| 4,874,474 | 10/1989 | Wang | 310/236 |
| 4,930,210 | 6/1990 | Wang | 29/597 |
| 5,008,577 | 4/1991 | Wang | 310/233 |
| 5,064,342 | 11/1991 | Iwai | 415/55.1 |
| 5,095,239 | 3/1992 | Wang | 310/221 |
| 5,231,321 | 7/1993 | Takiguchi | 310/51 |
| 5,363,005 | 11/1994 | Shibata et al. | 310/244 |
| 5,473,212 | 12/1995 | Crook et al. | 310/221 |

FOREIGN PATENT DOCUMENTS

| | | | |
|---|---|---|---|
| 0168227 | 1/1986 | European Pat. Off. | 310/233 |
| 0364292 | 4/1990 | European Pat. Off. | 310/233 |
| 2000914 | 1/1979 | United Kingdom | 310/233 |
| 2183933 | 6/1987 | United Kingdom | 310/233 |
| 2202686 | 9/1988 | United Kingdom | 310/233 |
| 2224165 | 4/1990 | United Kingdom | 310/233 |

*Primary Examiner*—Steven L. Stephan
*Assistant Examiner*—Elvin G. Enad
*Attorney, Agent, or Firm*—Ostrolenk, Faber, Gerb & Soffen, LLP

[57] ABSTRACT

A commutator has a base, a plurality of commutator segments mounted on the base and a noise suppression element. The noise suppression element is electrically connected to the segments by a connecting element, in the form of an elastomeric ring having conductive portions, which is compressed between the noise suppression element and the commutator segments, or terminals associated with the commutator segments, to avoid the need to solder the noise suppression element to the segments.

18 Claims, 2 Drawing Sheets

NOISE SUPPRESSED COMMUTATOR

This is a continuation of application Ser. No. 08/435.734 filed on May 5, 1995 now abandoned.

BACKGROUND OF THE INVENTION

1. Field of the Invention

This invention relates to miniature electric motors and, in particular, to commutators for such motors incorporating a noise suppression element.

2. Description of the Prior Art

Noise suppression elements are commonly used in electric motors having a commutator to reduce electrical noise produced by commutation. Noise suppression elements are commonly made of ceramic material which are soldered to the commutator segments. The manufacturing of such motors is time consuming and care is required not to damage the noise suppression element during soldering by excessive heat. Hence, ways to avoid soldering of the noise suppression element have been investigated.

GB2202686 discloses a method of mounting a noise suppression element in the form of a ceramic varistor ring coupled to segment tangs or terminals using a clip on plastic clamping member which also acts as a fan. The clamping member allows the varistor to be resiliently supported against the commutator terminals by fingers which urge the varistor away from the clamping member. However, as the varistor is ceramic and has very little flexibility, the terminals must be all perfectly aligned in the same plane to enable all the terminals to make proper contact with the varistor.

Flexible or elastomeric noise suppression elements, such as those disclosed in GB2000914 and GB2183933, have been developed. These noise suppression elements are basically elastomeric rings which have been impregnated with a conductive material to produce a conductive elastic ring.

However, the noise suppression characteristics of such elastic rings are not as good as those of ceramic varistors. Hence, there is a need for a method of connecting noise suppression elements, particularly of the rigid type, to commutator segments without the use of heat.

SUMMARY OF THE INVENTION

The connection of noise suppression elements to commutator segments without using heat is achieved in the present invention by providing a resiliently deformable connecting structure to electrically connect the noise suppression element to the commutator segment. Accordingly, the present invention provides a commutator having a base, a plurality of commutator segments mounted on the base, a noise suppression element, and a resillient connecting means for electrically connecting the noise suppression element to the segments.

Preferably, the connector is compressed against the noise suppression element to establish electrical contact therewith.

The connector may be compressed directly between the noise suppression element and the segments, e.g., by using a clamping ring which supports the noise suppression element and urges it into contact with the connector, thereby deforming and clamping the connector between the noise suppression element and the segments directly. Alternatively, the connector may be associated with other elements and be electrically connected to the segments by way of separate terminal pieces used to connect the segments to the respective rotor winding portions or armature leads.

Preferably, the commutator has a crown which mates with the base and the noise suppression element and the connector are located between the crown and the base. This would allow the mated crown and base to clamp the noise suppression element and connector together without the use of a separate clamping ring.

Preferably, the segments are associated with respective insulation displacing terminals which straddle and grip respective armature leads which are held by the crown as the terminal and crown are brought together. Thus, the armature winding terminations may be completed prior to the fitting of the base with the segments to the crown. With the noise suppression element and the connector being sandwiched between the base and the crown, the connector may electrically connect the noise suppression element to the commutator segments by making direct electrical contact with the terminals as the connector is compressed between the noise suppression element and the terminals.

Preferably, the connector is a resiliently deformable ring having one or more conductive portions which electrically connect the noise suppression element to the segments and, most preferably, the connecting ring is formed from hollow elastomeric tubing with a surface coating of conductive material, for example, copper or carbon. When the surface coating is highly conductive, it is important that the surface coating be applied in an intermittent fashion to avoid short circuiting the commutator segments while connecting the noise suppression element to the respective segments. When the ring is not highly conductive, a single conductive portion may be used which may provide additional noise suppression in a manner similar to the elastomeric noise suppressors of the prior art.

Alternatively, the connector may be an annular disc or ring formed from a sheet of elastomeric material which is conductive perpendicularly across the sheet but substantially non-conductive along the sheet. Such a sheet, also known as an AF-type interconnector, is more fully described in U.S. Pat. No. 4199637.

Preferably, the noise suppression element is an annular ceramic varistor ring as this provides superior noise suppression.

The invention also provides a method of connecting a noise suppression element, including a rigid element such as a ceramic varistor ring, to the commutator segments of an electric motor. The method comprises the steps of providing a commutator with a plurality of commutator segments mounted on a base, fitting the element to the base, fitting an elastomeric ring having conductive portions thereon to the commutator, adjacent to the element, and deforming the ring to urge it into resilient contact with the element, thereby to establish electrical contact between the element and the segments.

Preferably, the step of deforming the ring includes compressing the ring between the element and terminals associated with the segments.

The method of the present invention allows a rigid noise suppression element to be connected to the commutator segments of the motor without the use of heat, for example, as associated with soldering which may lead to damage of the element if not applied correctly.

BRIEF DESCRIPTION OF THE DRAWING

The invention will now be more particularly described by way of example with reference to the accompanying drawings in which.

Figure 1:
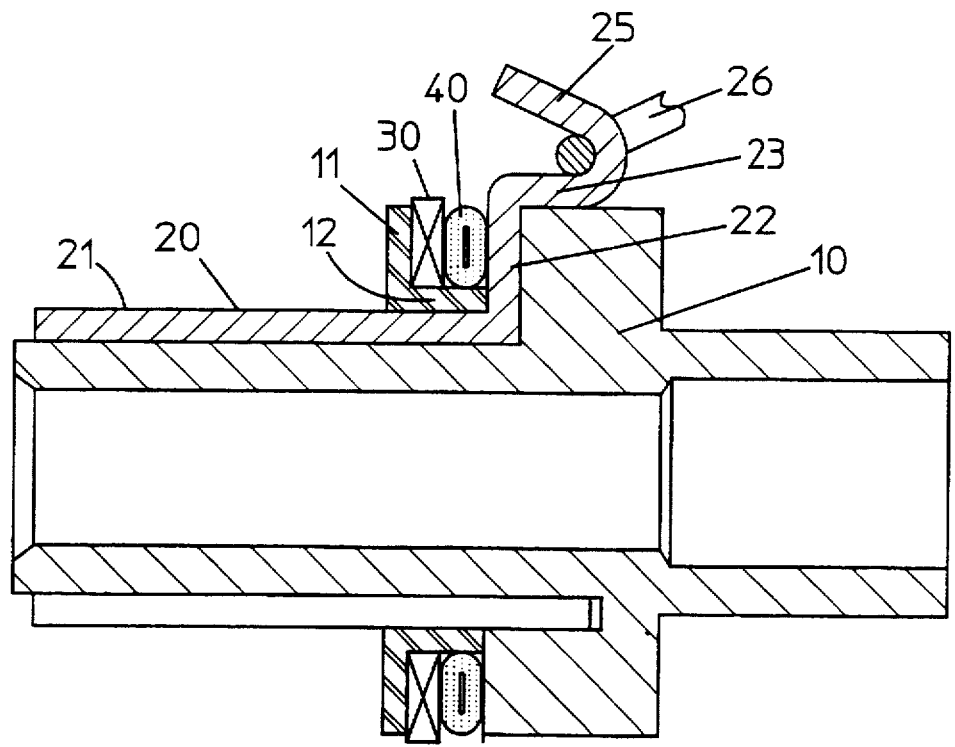
FIG. 1 is a sectional side elevational view of a commutator according to the present invention having a single piece housing.

DESCRIPTION OF THE PREFERRED EMBODIMENT(S):

The commutator of FIG. 1 has a base 10 supporting a number of commutator segments 20. The segments have a brush contacting portion 21, a radial extension 22, an axial extension 23 terminating in a tang or terminal 25 for connecting to an armature lead 26. A clamping ring 11 is used to hold the segments 20 to the base 10 while urging a ceramic annular varistor element 30 into contact with a connecting ring 40 with sufficient force to deform the ring as shown.

The ring 40 is formed from a hollow elastomeric tube which is readily and resiliently deformable. The tubing has an intermittent conductive coating as more easily seen in FIG. 4 providing a number of conductive portions 41. Alternatively, the ring could be impregnated with a conductive material, e.g., carbon, to form a conductive ring or a ring with conductive portions. In FIG. 1, the ring has been compressed resulting in a flattened ring. The resilient urgings of the ring bring the conductive portions 41 into electrical contact with respective commutator segments and the varistor.

The varistor 30 is a ceramic varistor of the type generally known in the prior art and will not be described further here save to mention that it has terminal portions formed on its surface for being electrically connected to the commutator segments, in this case, via the ring 40. The clamping ring 11 has a small ledge or seat 12 on which the varistor 30 sits. The conductive portions 41 of the connecting ring 40 bear against respective varistor contact portions and segment radial extensions 22 to electrically connect the varistor 30 to the segment radial extensions 22.

Figure 2:
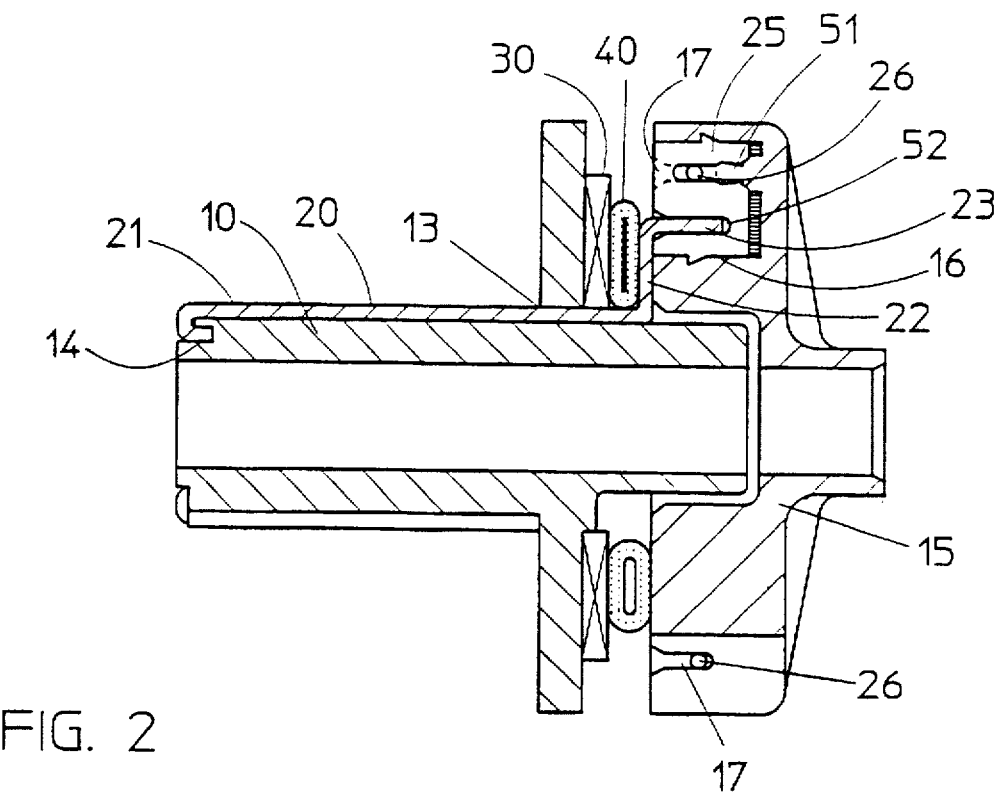
FIGS. 2 and 3 are similar views as FIG. 1 of commutators with a two part housing in accordance with the present invention.

In the embodiment of FIG. 2, the commutator has a two part housing comprising a base 10 and a crown 15. The crown has a number of recesses 16 for receiving insulation displacing terminals 25. Slots 17 pass across the recesses 16 for receiving armature leads 26. The terminals 25 are plate like with two slots 51 and 52. Slot 51 straddles and grips an armature lead 26 held in slot 17 as the terminal 25 is pressed into the recess 16 in the crown 15. As the terminal is forced over the armature lead 26, any insulation on the armature lead 26 is displaced by the edges of the slot 51 to establish direct electrical connection between the armature lead 26 and the terminal 25. Slot 52 of the terminal 25 is arranged to receive an axial extension 23 of the commutator segment 20 as the base 10 is fitted to or mated with the crown 15 to establish electrical contact between the armature lead 26 and the commutator segment 20.

In the embodiment of FIG. 2, the varistor ring 30 is mounted against a rear surface of the commutator base 10 with the ring 40 being clamped against the varistor ring 30 by radially extending portions 22 of the segments 20. In this particular arrangement, the commutator segments 20 would be inserted into the base 10 through apertures 13 from the rear or crown end of the base 10 and then secured to the base 10 by deforming the distal end of the brush contacting portion of the segments 21 into a recess 14 formed in the front end of the base 10.

Figure 3:
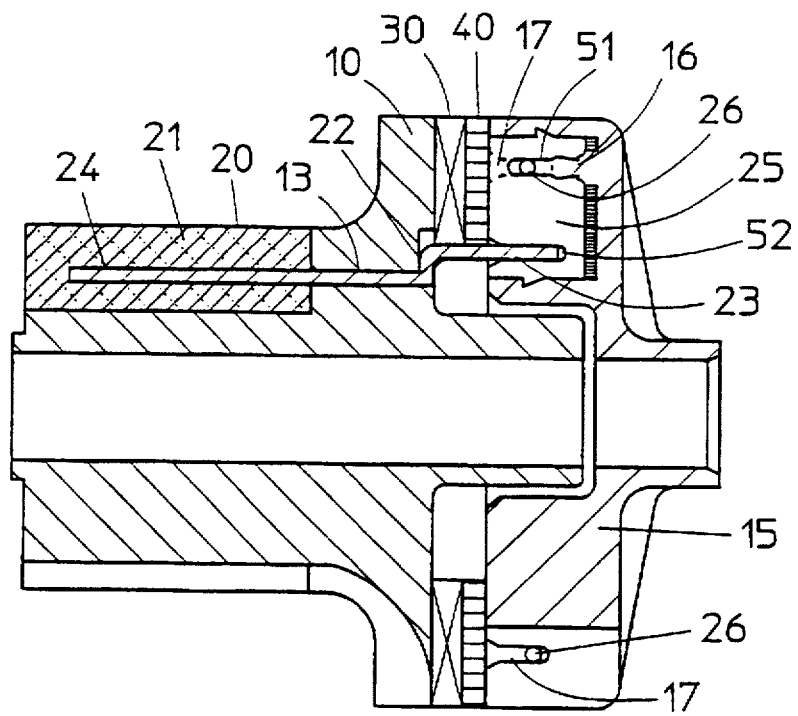

In the embodiment of FIG. 3, a cylindrical carbon segment commutator having a two part housing is shown. The commutator segments have a brush contacting portion 21 formed from a carbon based material. A copper bar 24 is embedded in the carbon material and extends through a slot in the base to mate with the terminal 25. A short radially extending portion 22 provides a butt for the copper bar 24 to ensure it is correctly inserted.

In this embodiment, the connecting ring 40 illustrated is an annular disc formed from an anisotropically conductive elastomeric material sheet which is conductive across the sheet but not along the sheet. This type of connecting ring is shown as an alternative to the hollow or tubular ring shown in the other illustrated embodiments. One such material manufactured by Shin-Etsu Polymer Company of Japan for use in electronic watches and calculators is described as an anisotropically conductive composite wafer or an electrically insulating elastomeric matrix embedded with aligned conductive fibers. In a simple form, it is a rubber sheet with embedded carbon filaments extending perpendicular to the plane of the sheet giving good conduction across the sheet while being substantially non-conductive along the sheet.

As in the embodiment of FIG. 2, the varistor ring 30 is located against the rear wall of the base 10 but in this case, the connecting ring 40 is not sandwiched by or in direct contact with the segments 22. As the base 10 is fitted to the crown 15, the connecting ring 40 is compressed between the varistor ring 30 on the one side, and the crown 15 and terminals 25 on the other, where the conductive portions of the connecting ring 40 bear on respective terminals and connection portions of the varistor 40 to electrically connect the varistor 40 to the terminals 25 and thus, to the commutator segments 20.

Figure 4:
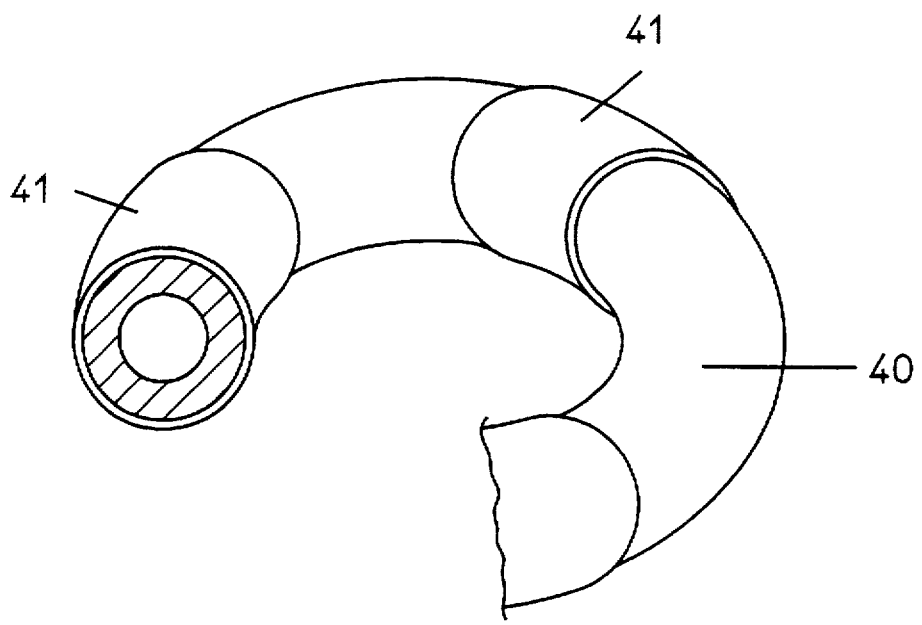
FIG. 4 is a perspective view of an elastomeric connecting ring forming a part of the commutators of FIGS. 1 and 2.

FIG. 4 illustrates the preferred elastomeric ring 40 shown in perspective with a partial cut-away to reveal a hollow interior and to show, diagramatically, the conductive surface layer 41, such as flexible copper based coatings. Being hollow, the ring 40 can be compressed further using a relatively light force resulting in greater reliability of the contact between the ring 40, the varistor 30 and the segment/terminal even under adverse operating conditions.

Thus, it can be seen that the noise suppression element can be fitted to the commutator without the application of heat in a reliable and convenient manner and, thus, allowing the use of rigid and/or brittle noise suppression elements, such as ceramic varistors, in a mechanical connection type commutator. Although only cylindrical commutators have been illustrated in the embodiments, it will be readily apparent to those working in this area of technology that this invention is equally applicable to planar or face plate type commutators.

I claim:

1. A commutator for an electric motor, the commutator comprising:

a base;

a plurality of commutator segments mounted on the base, each commutator segment having a terminal portion;

an annular ceramic varistor;

an annular resiliently deformable ring electrically connecting the varistor to the terminals portions; and a crown having a plurality of separate insulation displacing terminals, each of the insulation displacing terminals straddling and gripping a respective armature lead of the electric motor and electrically coupling the lead to a respective terminal portion, the crown mating with the base in such a manner that the resiliently deformable ring is clamped between the varistor and the insulation displacing terminals.

2. The commutator of claim 1, wherein the base has a radially extending wall, the segments extend through the wall, and the wall bears against the annular varistor.

3. The commutator of claim 1, wherein the resiliently deformable ring is formed from hollow elastomeric tubing having an intermittent surface coating of conductive material thereon.

4. The commutator of claim 3, wherein the surface coating of conductive material is copper.

5. The commutator of claim 3, wherein the surface coating of conductive material is carbon.

6. The commutator of claim 1, wherein the resiliently deformable ring is formed from an anistropically conductive elastomeric sheet material which is conductive perpendicularly across the sheet but substantially non-conductive along the sheet.

7. A commutator for an electric motor, the commutator comprising:

a base having a cylindrical surface;

a plurality of commutator segments mounted on the cylindrical surface of the base, each segment having an integral terminal including a radially extending portion extending radially outwardly from the cylindrical surface of the base;

an annular ceramic varistor;

an annular resiliently deformable ring electrically connecting the varistor to the commutator segments; and an annular clamping member having a radially extending end wall and an axially extending seat about which the varistor and the deformable ring are disposed, the annular clamping member being mounted about the commutator segments via an interference fit, the radially extending end wall of the clamping member bearing against the varistor such that the deformable ring is clamped between the varistor and the radially extending portions of the terminals.

8. The commutator of claim 7, wherein the resiliently deformable ring is formed from hollow elastomeric tubing having an intermittent surface coating of conductive material thereon.

9. The commutator of claim 8, wherein the surface coating of conductive material is copper.

10. The commutator of claim 8, wherein the surface coating of conductive material is carbon.

11. The commutator of claim 7, wherein the resiliently deformable ring is formed of an anisotropically conductive elastomeric sheet material which is conductive perpendicularly across the sheet but substantially non-conductive along the sheet.

12. A commutator for an electric motor, the commutator comprising:

a base, a plurality of commutator segments mounted on the base, each commutator segment having a terminal portion which includes a radially extending part extending radially outwardly from the base;

an annular ceramic varistor;

an annular resiliently deformable ring for electrically connecting the varistor to the terminal portions of the commutator segments; and a crown having a plurality of separate insulation displacing terminals, each of the insulation displacing terminals straddling and gripping a respective armature lead of the electric motor and connecting the respective armature lead to a respective terminal portion, the crown mating with the base in such a manner that the resiliently deformable ring is clamped between the varistor and the radially extending parts of the terminal portions.

13. The commutator of claim 12, wherein the base has a radially extending wall, the segments extend through the wall, and the wall bears against the annular varistor.

14. The commutator of claim 12, wherein the resiliently deformable ring is formed from an anisotropically conductive elastomeric sheet material which is conductive perpendicularly across the sheet but substantially non-conductive along the sheet.

15. The commutator of claim 12, wherein the resiliently deformable ring is formed from hollow elastomeric tubing having an intermittent surface coating of conductive material thereon.

16. The commutator of claim 15, wherein the surface coating of conductive material is copper.

17. The commutator of claim 15, wherein the surface coating of conductive material is carbon.

18. A commutator for an electric motor, the commutator comprising:

a substantially cylindrical axially extending base;

a plurality of commutator segments disposed on the base and extending axially along the base;

an annular ceramic varistor including a central aperture in which the cylindrical base and commutator segments are received in a coaxial orientation; and an annular resiliently deformable ring including a central aperture in which the cylindrical base and commutator segments are received in a coaxial orientation, the deformable ring resiliently urging the annular ceramic varistor into electrical engagement with the commutator segments.

* * * * *